(12) United States Patent
Lin et al.

(10) Patent No.: US 10,884,460 B2
(45) Date of Patent: *Jan. 5, 2021

(54) EARLY WARNING METHOD, EARLY WARNING APPARATUS, AND FLEXIBLE DISPLAY APPARATUS

(71) Applicant: GUANGDONG OPPO MOBILE TELECOMMUNICATIONS CORP., LTD., Guangdong (CN)

(72) Inventors: Yugui Lin, Guangdong (CN); Jiao Cheng, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/313,605

(22) PCT Filed: Jun. 27, 2017

(86) PCT No.: PCT/CN2017/090306
§ 371 (c)(1),
(2) Date: Dec. 27, 2018

(87) PCT Pub. No.: WO2018/006725
PCT Pub. Date: Jan. 11, 2018

(65) Prior Publication Data
US 2019/0317559 A1    Oct. 17, 2019

(30) Foreign Application Priority Data
Jul. 8, 2016   (CN) .......................... 2016 1 0542539

(51) Int. Cl.
*G06F 1/16*     (2006.01)
*G06F 9/54*     (2006.01)
*G09F 9/30*     (2006.01)

(52) U.S. Cl.
CPC .......... *G06F 1/1677* (2013.01); *G06F 1/1652* (2013.01); *G06F 9/542* (2013.01); *G09F 9/301* (2013.01)

(58) Field of Classification Search
CPC ...... G06F 1/1677; G06F 1/1652; G06F 9/542; G09F 9/301
See application file for complete search history.

(56) References Cited

U.S. PATENT DOCUMENTS 9,854,667 B2 * 12/2017 Yukawa ................. H05K 1/028
2012/0329528 A1 * 12/2012 Song .................... H04M 1/0268
455/566

(Continued)

FOREIGN PATENT DOCUMENTS

CN      103513910      1/2014
CN      104461444      3/2015

(Continued)

OTHER PUBLICATIONS

EPO, Office Action for EP Application No. 17823537, dated May 15, 2019.

(Continued)

*Primary Examiner* — Kenneth B Lee, Jr.
(74) *Attorney, Agent, or Firm* — Hodgson Russ LLP

(57) ABSTRACT

The present disclosure discloses an early warning method, an early warning apparatus, and a flexible display apparatus. The early warning method includes: generating first early-warning information on a flexible display when the flexible display stored in a flexible display apparatus satisfies an extension early-warning condition; obtaining a first extended length of the flexible display; determining whether the first extended length reaches a first preset length threshold; and if yes, eliminating the first early-warning information from the flexible display.

18 Claims, 5 Drawing Sheets

(56) References Cited

U.S. PATENT DOCUMENTS

| | | | |
|---|---|---|---|
| 2014/0002396 A1 | 1/2014 | Zhao et al. | |
| 2014/0204037 A1* | 7/2014 | Kim | G06F 1/1647 |
| | | | 345/173 |
| 2015/0009129 A1* | 1/2015 | Song | G06F 1/1694 |
| | | | 345/156 |
| 2015/0042674 A1 | 2/2015 | Lin | |
| 2015/0277854 A1 | 10/2015 | Zhang | |
| 2019/0287434 A1* | 9/2019 | Lin | H04M 1/725 |

FOREIGN PATENT DOCUMENTS

| | | |
|---|---|---|
| CN | 104503889 | 4/2015 |
| CN | 104680943 | 6/2015 |
| CN | 105138187 | 12/2015 |
| CN | 105446616 | 3/2016 |
| CN | 106210310 | 12/2016 |
| EP | 1970886 | 9/2008 |
| EP | 2538639 | 12/2012 |
| WO | 2016024852 | 2/2016 |

OTHER PUBLICATIONS

SIPO, First Office Action for CN Application No. 201610542539, dated Aug. 21, 2017.
WIPO, ISR for PCT/CN2017/090306, Aug. 30, 2017.
USPTO, Office Action for U.S. Appl. No. 16/430,620, dated Apr. 3, 2020.
EPO, Summons to attend oral proceedings for EP Application No. 17823537.0, Oct. 9, 2020.
IPI, Office Action for IN Application No. 201917002668, dated Aug. 14, 2020.

\* cited by examiner

US 10,884,460 B2

EARLY WARNING METHOD, EARLY WARNING APPARATUS, AND FLEXIBLE DISPLAY APPARATUS

CROSS-REFERENCE TO RELATED APPLICATIONS

This application is a national phase of International Application No. PCT/CN2017/090306 filed on Jun. 27, 2017, which is based on and claims a priority to Chinese Patent Application Serial No. 201610542539.9, filed on Jul. 8, 2016, the entire contents of which are incorporated herein by reference.

FIELD

The present disclosure relates to electronic devices, and more particularly to an early warning control method, an early warning control apparatus and a flexible display apparatus.

BACKGROUND

A screen of a display apparatus, for example, a screen of a smartphone is typically fixed on the apparatus and cannot scroll, such that a size of the display is greatly influenced by a size of the apparatus, thus making against a large display.

With development of the flexible display, some manufactures produces the flexible display wound in the display apparatus, so as to enlarge a display interface of the display apparatus. However, since the flexible display of the flexible display apparatus in the related art is fragile, the flexible display is easily to be damaged during an extension.

DISCLOSURE

Accordingly, embodiments of the present disclosure provide an early warning method. The method includes: generating first early-warning information on a flexible display when the flexible display stored in a flexible display apparatus satisfies an extension early-warning condition; obtaining a first extended length of the flexible display; determining whether the first extended length reaches a first preset length threshold; and eliminating the first early-warning information from the flexible display when the first extended length reaches the first preset length threshold.

Embodiments of the present disclosure further provide an early warning apparatus. The apparatus includes: a non-transitory computer-readable medium comprising computer-executable instructions stored thereon, and an instruction execution system which is configured by the instructions to implement at least one of: a generating module, configured to generate first early-warning information on a flexible display when the flexible display stored in a flexible display apparatus satisfies an extension early-warning condition; an obtaining module, configured to obtain a first extended length of the flexible display; a first determining module, configured to determine whether the first extended length reaches a first preset length threshold; and an eliminating module, configured to eliminate the first early-warning information from the flexible display when the determining module determines that the first extended length reaches the first preset length threshold.

Embodiments of the present disclosure further provide a flexible display apparatus. The flexible display apparatus includes a flexible display, a sensor and a controller. The sensor is configured to sense a first extended length of the flexible display. The controller is configured to send an electronic signal according to the first extended length, the electronic signal being configured to indicate the flexible display to generate first early-warning information or indicate the flexible display to eliminate the first early-warning information.

BRIEF DESCRIPTION OF THE DRAWINGS

To illustrate the solutions according to the embodiments of the present disclosure or in the related art more clearly, accompanying drawings needed for describing the embodiments or the related art are briefly introduced below. Obviously, the accompanying drawings in the following descriptions are merely some embodiments of the present disclosure, and persons of ordinary skill in the art may obtain other drawings according to the accompanying drawings without making creative efforts.

To illustrate the solutions according to the embodiments of the present disclosure more clearly, accompanying drawings needed for describing the embodiments are briefly introduced below. Obviously, the accompanying drawings in the following descriptions are merely some embodiments of the present disclosure, and persons of ordinary skill in the art may obtain other drawings according to the accompanying drawings without making creative efforts.

EMBODIMENTS OF THE PRESENT DISCLOSURE

The solutions of the embodiments of the present disclosure are clearly and completely described below with reference to the accompanying drawings in the embodiments of the present disclosure.

Figure 1:
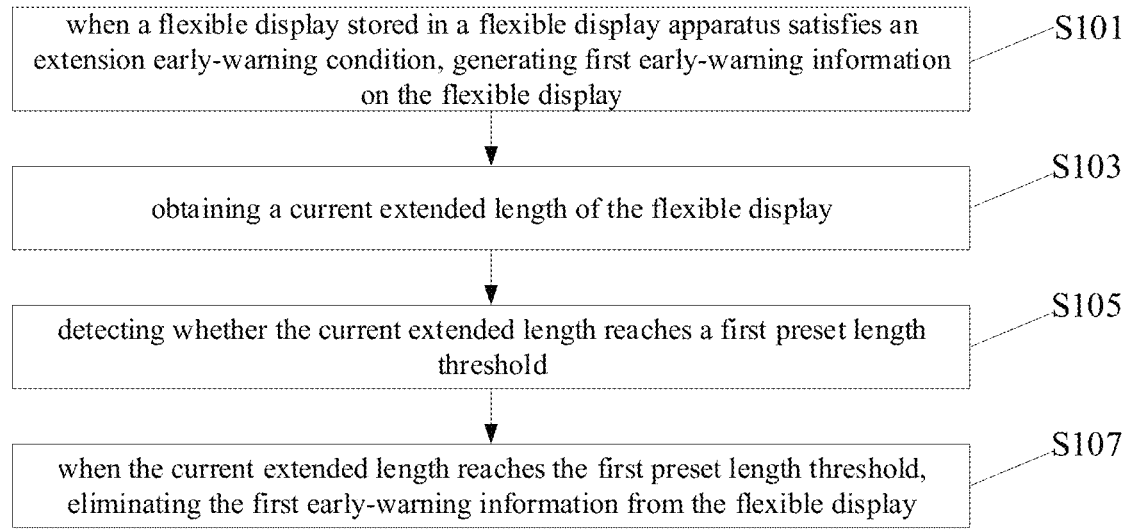
FIG. 1 is a flow chart of an early warning control method according to an embodiment of the present disclosure.

FIG. 1 is a flow chart of an early warning method according to an embodiment of the present disclosure. The early warning method include the followings.

At block S101, when a flexible display 20 stored in a flexible display apparatus 100 satisfies an extension early-warning condition, first early-warning information is generated on the flexible display 20.

Figure 4:
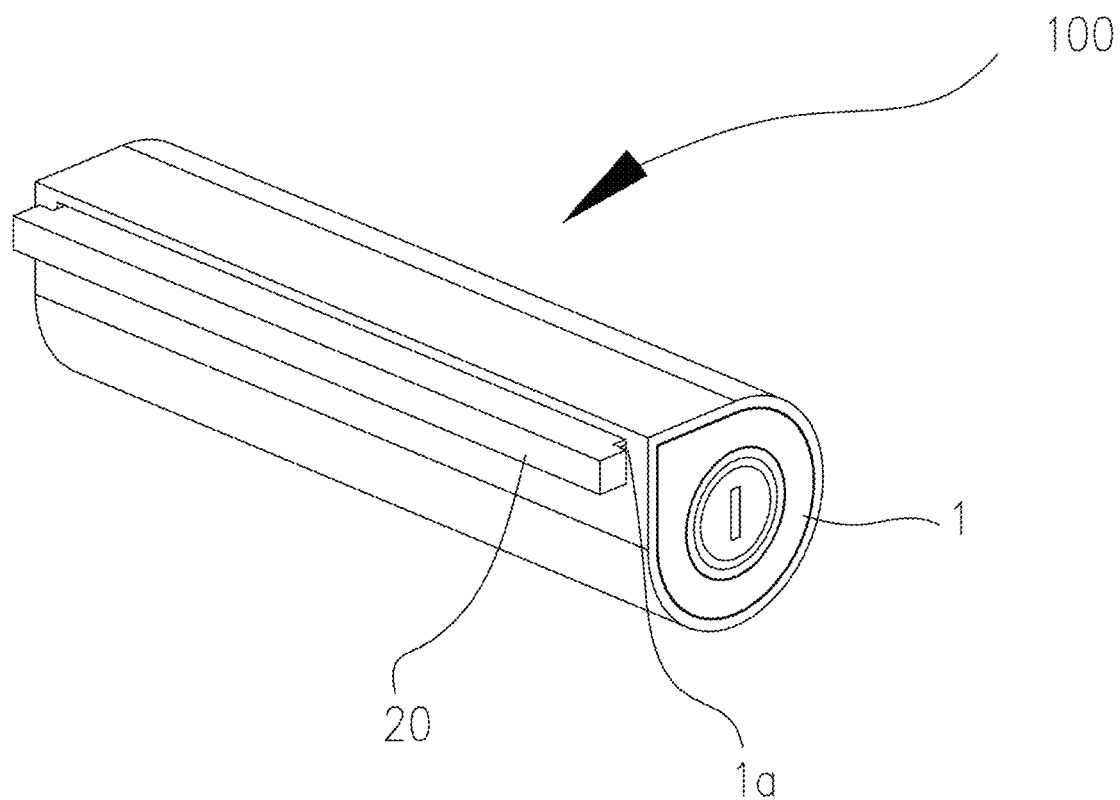
FIG. 4 is a schematic diagram illustrating a flexible display apparatus in a curled state according to an embodiment of the present disclosure.

As illustrated in FIG. 4, the flexible display apparatus 100 may be any device with communication and storage functions, for example, a tablet computer, a mobile terminal, an electronic reader, a remote controller, a personal computer (PC), a laptop, a vehicle-mounted device, a network TV, a wearable device or other smart devices with network functions.

Figure 5:
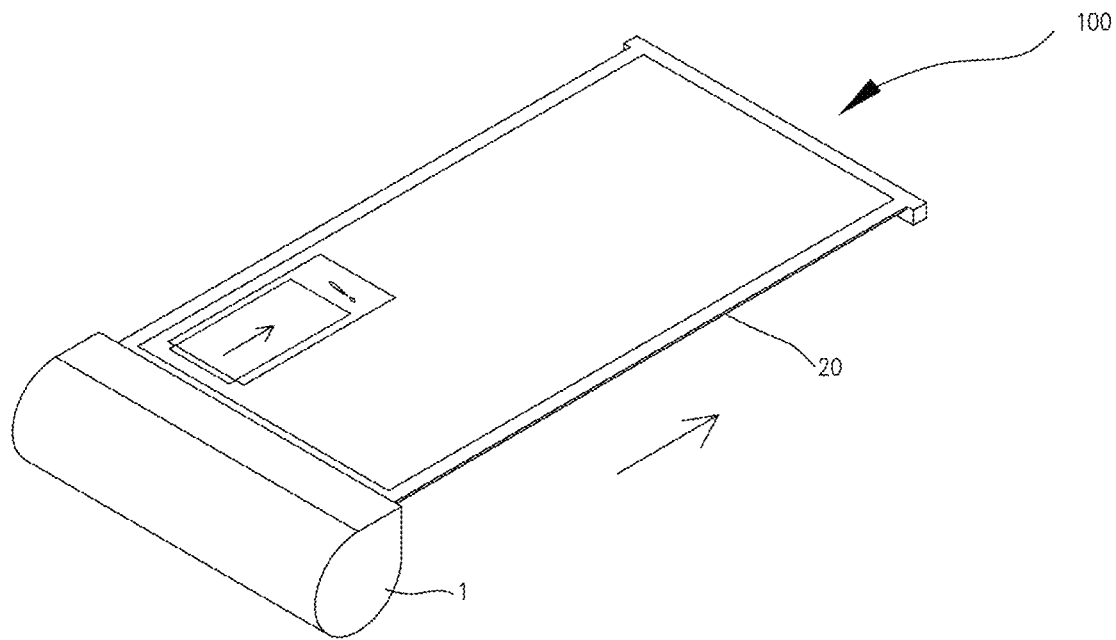
FIG. 5 is a schematic diagram illustrating a flexible display apparatus in an extension state according to an embodiment of the present disclosure.

In an embodiment, as illustrated in FIG. 4 and FIG. 5, the flexible display apparatus 100 includes a cylinder-shaped shell 1, a shaft (not shown) and the flexible display 20. The shell 1 is provided with a slot 1a. The flexible display 20 can display electronic images and have display and touch control functions. An end of the flexible display 20 is fixed on the shaft to enable the flexible display 20 to wind round the shaft. When the shaft is disposed in the shell 1, the flexible display 20 can be received in the shell 1. When the flexible display apparatus 100 is extended, the other end of the flexible display 20 can be extended, such that the flexible display 20 extends from the slot 1a and expands out of the shell 1 to form a bigger display/touch surface. The flexible display apparatus 100 is further provided with a sensor (not shown) and a controller (not shown). The sensor is configured to sense an extended length of the flexible display 20. The controller is configured to send a corresponding electronic signal according to the extended length of the flexible display 20.

At block S103, a current extended length of the flexible display 20 is obtained.

In detail, the current extended length of the flexible display 20 is obtained by the sensor in the flexible display apparatus 100.

At block S105, it is detected whether the current extended length reaches a first preset length threshold.

In detail, the first preset length threshold may be a length of the flexible display 20 when the flexible display 20 is fully extended. Block S105 is equivalent to detecting whether the flexible display 20 is fully extended currently.

At block S107, when the current extended length reaches the first preset length threshold, the first early-warning information is eliminated from the flexible display 20.

In detail, when it is detected that the flexible display 20 is fully extended, the first early-warning information is eliminated from the flexible display 20, such that the user no longer extends the flexible display 20 to avoid damage to the flexible display 20.

The early warning method according to the present disclosure generates the first early-warning information on the flexible display 20 when the flexible display 20 satisfies the extension early-warning condition, such that the user can intuitively acquire a current extension state of the flexible display 20 from the first early-warning information on the flexible display 20 when the flexible display 20 is almost fully extended, and the early warning method further eliminates the first early-warning information from the flexible display 20 when the current extended length of the flexible display 20 satisfies the first preset length threshold, such that the user may no longer extend the flexible display 20 to avoid damage to the flexible display 20. The early warning method may serve as a warning to the user.

Figure 2:
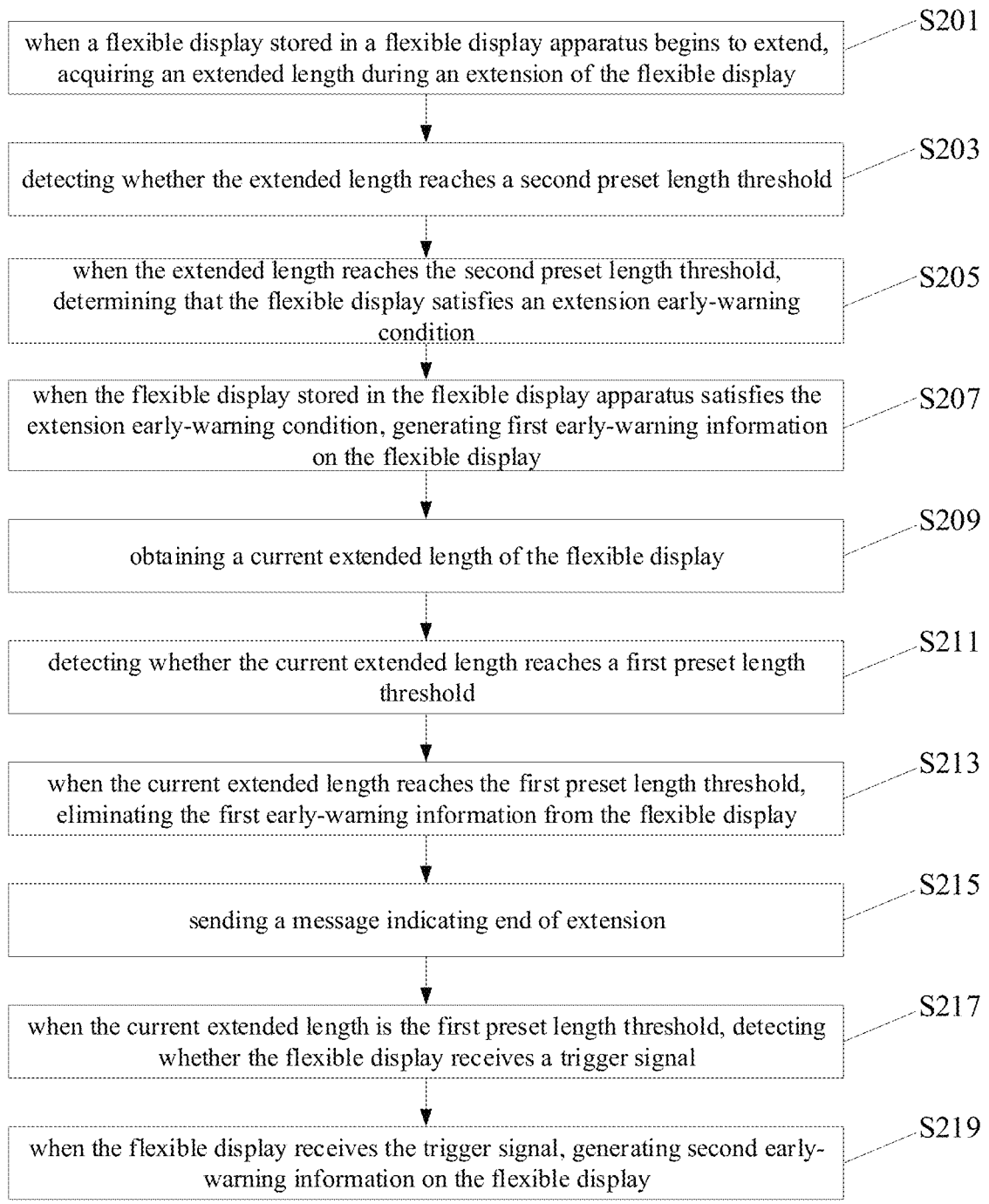
FIG. 2 is a flow chart of an early warning control method according to another embodiment of the present disclosure.

FIG. 2 is a flow chart of an early warning method according to another embodiment of the present disclosure. The early warning method includes the followings.

At block S201, when a flexible display 20 stored in a flexible display apparatus 100 begins to extend, an extended length during an extension of the flexible display 20 is obtained.

In detail, the flexible display 20 is stored in the flexible display apparatus 100. As illustrated in FIG. 4, the flexible display apparatus 100 may be any device with communication and storage functions, for example, a tablet computer, a mobile terminal, an electronic reader, a remote controller, a personal computer (PC), a laptop, a vehicle-mounted device, a network TV, a wearable device or other smart devices with network functions.

In an embodiment, as illustrated in FIG. 4 and FIG. 5, the flexible display apparatus 100 includes a cylinder-shaped shell 1, a shaft (not shown) and the flexible display 20. The shell 1 is provided with a slot 1a. The flexible display 20 can display electronic images and have display and touch control functions. An end of the flexible display 20 is fixed on the shaft to enable the flexible display 20 to wind round the shaft. When the shaft is in the shell 1, the flexible display 20 can be received in the shell 1. When the flexible display apparatus 100 is extended, the other end of the flexible display 20 can be extended, such that the flexible display 20 extends from the slot 1a and expands out of the shell 1 to form a bigger display/touch surface. The flexible display apparatus 100 is further provided with a sensor (not shown) and a controller (not shown). The sensor is configured to sense an extended length of the flexible display 20. The controller is configured to send a corresponding electronic signal according to the extended length of the flexible display 20.

At block S203, it is detected whether the extended length reaches a second preset length threshold.

At block S205, when the extended length reaches the second preset length threshold, it is determined that the flexible display 20 satisfies an extension early-warning condition.

The second preset length threshold may be 90% of a length of the flexible display 20 when the flexible display 20 is fully extended. In other words, when the extended length of the flexible display 20 reaches 90% of the length of the flexible display 20 when the flexible display 20 is fully extended, it is determined that the extension early-warning condition is satisfied.

At block S207, when the flexible display 20 stored in the flexible display apparatus 100 satisfies the extension early-warning condition, first early-warning information is generated on the flexible display 20.

In detail, when the extended length of the flexible display 20 reaches 90% of the length of the flexible display 20 when the flexible display 20 is fully extended, the first early-warning information is generated on the flexible display 20, such that the flexible display apparatus 100 does not provide an early-warning at the beginning but provides the early-warning when the flexible display 20 is almost fully extended, thus saving electricity quantity of the flexible display apparatus 100. In other embodiments, the second preset length threshold can be set as required, for example, the second preset length threshold can be set to 0, which means that as long as the flexible display 20 is extended, the first early-warning information is generated on the flexible display 20.

Figure 3:
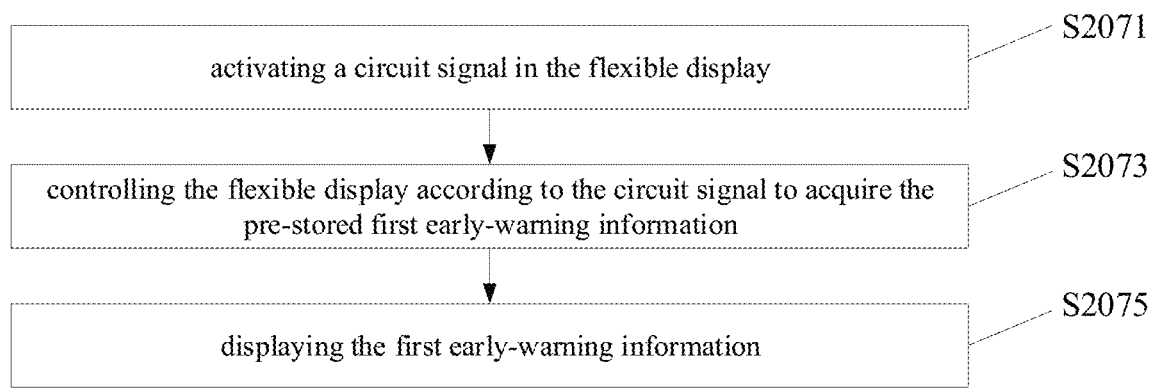
FIG. 3 is a flow chart of a process of displaying a first early-warning image in a flexible display of FIG. 2.

FIG. 3 is a flow chart of a process of generating the first early-warning information on the flexible display 20. The process includes the followings.

At block S2071, a circuit signal in the flexible display 20 is activated.

At block S2073, the flexible display 20 is controlled according to the circuit signal to generate the first early-warning information.

At block S2075, the first early-warning information is displayed.

The first early-warning information may be text information, for example, the first early-warning information shows "flexible display 20 is almost fully extended" or "extended length of flexible display 20 is xxx" or the like. The first early-warning information may also be graphic information, or information composed of text and graphic.

At block S209, a current extended length of the flexible display 20 is obtained.

In detail, the current extended length of the flexible display 20 is obtained by a sensor in the flexible display apparatus 100.

At block S211, it is detected whether the current extended length reaches a first preset length threshold.

In detail, the first preset length threshold may be a length of the flexible display 20 when the flexible display 20 is fully extended. Block S105 is equivalent to detecting whether the flexible display 20 is fully extended currently.

At block S213, when the current extended length reaches the first preset length threshold, the first early-warning information is eliminated from the flexible display 20.

In detail, when it is detected that the flexible display 20 is fully extended, the first early-warning information is eliminated from the flexible display 20, such that the user no longer extends the flexible display 20 to avoid damage to the flexible display 20.

At block S215, a message for indicating end of extension is sent.

In detail, after the first early-warning information is eliminated from the flexible display 20 exits, the message for indicating the end of extension can be displayed in the flexible display 20, such that the user may intuitively know that the flexible display 20 is fully extended, thus preventing from damaging the flexible display 20.

At block S217, when the current extended length is the first preset length threshold, it is detected whether the flexible display 20 receives a trigger signal.

At block S219, when the flexible display 20 receives the trigger signal, second early-warning information is generated on the flexible display 20.

In detail, when the flexible display 20 is fully extended, the sensor in the flexible display 20 further detects whether the flexible display 20 is extruded by an external force, i.e., whether the flexible display 20 receives the trigger signal, if yes, the second early-warning information is generated on the flexible display 20 to prompt the user that the flexible display 20 begins to curl up.

The early warning method according to the present disclosure generates the first early-warning information on the flexible display 20 when the flexible display 20 satisfies the extension early-warning condition, such that the user can intuitively acquire a current extension state of the flexible display 20 from the first early-warning information on the flexible display 20 when the flexible display 20 is almost fully extended, and the early warning method further eliminates the first early-warning information from the flexible display 20 when the current extended length of the flexible display 20 satisfies the first preset length threshold, such that the user may no longer extend the flexible display 20 to avoid damage to the flexible display 20. The early warning method may serve as a warning to the user.

Figure 6:
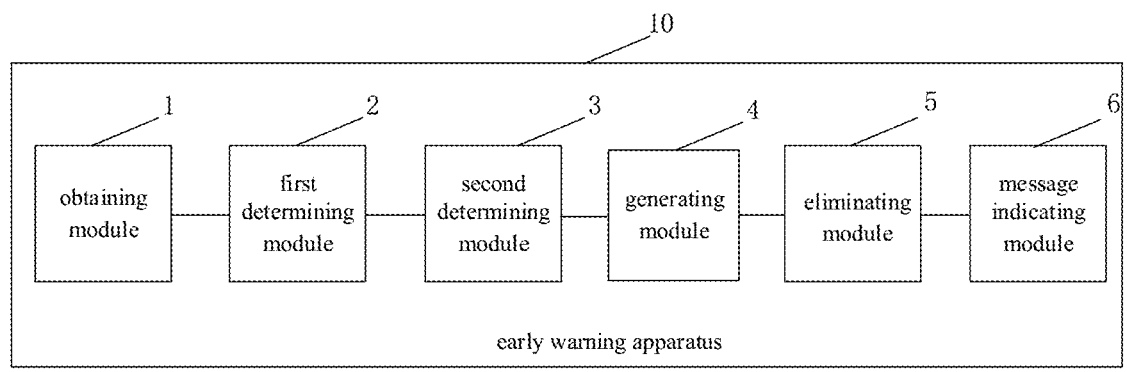
FIG. 6 is a block diagram of an early warning control apparatus according to an embodiment of the present disclosure.

The early warning apparatus 10 according to embodiments of the present disclosure will be described in detail with reference to FIG. 6. The early warning method illustrated in FIG. 6 is made according to the early warning method of embodiments illustrated in FIG. 1 and FIG. 2. For ease of description, only parts related to the embodiments of the present disclosure are illustrated. Regarding details not illustrated, reference can be made to embodiments of FIG. 1 and FIG. 2.

As illustrated in FIG. 4 and FIG. 5, the embodiments of the present disclosure provide a flexible display apparatus 100. The flexible display apparatus 100 includes an early warning apparatus 10. As illustrated in FIG. 6, the early warning apparatus 10 includes an obtaining module 1, a first determining module 2, a second determining module 3, a generating module 4 and an eliminating module 5.

The obtaining module 1 is configured to, when a flexible display 20 wound in a flexible display apparatus 100 begins to extend, obtain an extended length during an extension of the flexible display 20.

As illustrated in FIG. 4, the flexible display apparatus 100 may be any device with communication and storage functions, for example, a tablet computer, a mobile terminal, an electronic reader, a remote controller, a personal computer (PC), a laptop, a vehicle-mounted device, a network TV, a wearable device or other smart devices with network functions. The early warning apparatus 10 is disposed in the flexible display apparatus 100. In an embodiment, as illustrated in FIG. 4 and FIG. 5, the flexible display apparatus 100 includes a cylinder-shaped shell 1, a shaft (not shown) and the flexible display 20. The shell 1 is provided with a slot 1a. The flexible display 20 can display electronic images and have display and touch control functions. An end of the flexible display 20 is fixed on the shaft to enable the flexible display 20 to wind round the shaft. When the shaft is in the shell 1, the flexible display 20 can be received in the shell 1. When the flexible display apparatus 100 is extended, the other end of the flexible display 20 can be extended, such that the flexible display 20 extends from the slot 1a and expands out of the shell 1 to form a bigger display/touch surface. The flexible display apparatus 100 is further provided with a sensor (not shown) and a controller (not shown). The acquiring module 1 is configured as the sensor. The sensor is configured to sense an extended length of the flexible display 20. The controller is configured to send a corresponding electronic signal according to the extended length of the flexible display 20.

The first determining module 2 is configured to determine whether the acquired extended length reaches a second preset length threshold.

The second determining module 3 is configured to, when the first determining module 2 determines that the acquired extended length reaches the second preset length threshold, determine that the flexible display 20 satisfies an extension early-warning condition.

The first determining module 2 is configured as the controller in the flexible display apparatus 100. The second preset length threshold may be 90% of a length of the flexible display 20 when the flexible display 20 is fully extended. In other words, when the first determining module 2 determines that the extended length of the flexible display 20 reaches 90% of the length of the flexible display 20 when the flexible display 20 is fully extended, it is determined that the extension early-warning condition is satisfied and the first early-warning information is generated on the flexible display 20, such that the flexible display apparatus 100 does not provide an early-warning at the beginning but provides the early-warning when the flexible display 20 is almost fully extended, thus saving electricity quantity of the flexible display apparatus 100. In other embodiments, the second preset length threshold can be set as required, for example, the second preset length threshold can be set to 0, which means that as long as the flexible display 20 is extended, the first early-warning information is generated on the flexible display 20.

The generating module 4 is configured to, when the flexible display 20 stored in the flexible display apparatus 100 satisfies the extension early-warning condition, generate first early warning information on the flexible display 20.

The generating module 4 is configured as the flexible display 20. The first early-warning information is generated on the flexible display 20.

Figure 7:
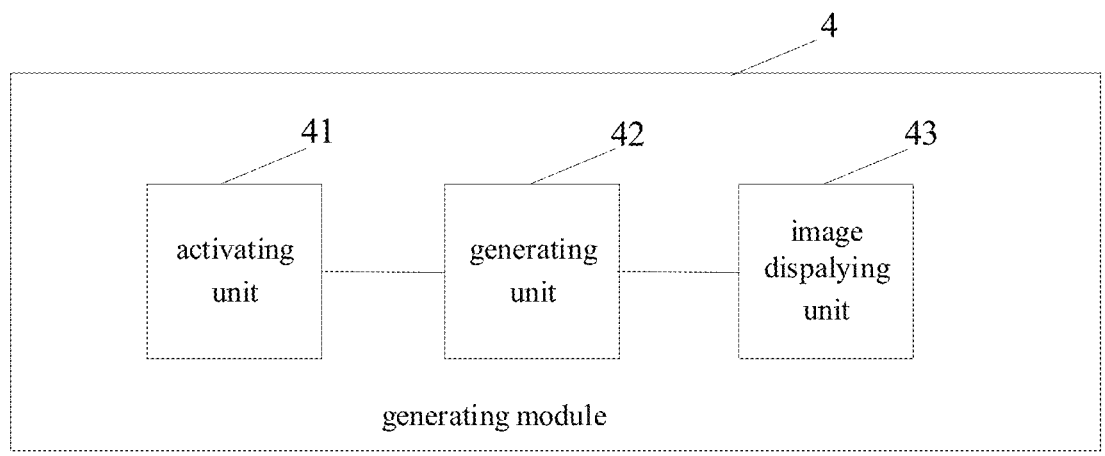
FIG. 7 is a block diagram of a displaying module of FIG. 6.

As illustrated in FIG. 7, the generating module 4 includes an activating unit 41, a generating unit 42 and an image displaying unit 43.

The activating unit 41 is configured to activate a circuit signal in the flexible display 20.

The generating unit 42 is configured to control the flexible display 20 according to the circuit signal to generate the first early-warning information.

The image displaying unit 43 is configured to display the first early-warning information.

The first early-warning information may be text information, for example, the first early-warning information shows "flexible display 20 is almost fully extended" or "extended length of flexible display 20 is xxx" or the like. The first early-warning information may also be graphic information, or information composed of text and graphic.

The obtaining module 1 is further configured to obtain a current extended length of the flexible display 20.

The first determining module 2 is further configured to determine whether the current extended length reaches a first preset length threshold.

The eliminating module 5 is configured to, when the first determining module 2 determines that the current extended length reaches a first preset length threshold, eliminate the first early-warning information from the flexible display 20.

In detail, the current extended length of the flexible display 20 is obtained by the obtaining module 1. The first preset length threshold may be a length of the flexible display 20 when the flexible display 20 is fully extended. The first determining module 2 determines the first preset length threshold may be a length of the flexible display 20 when the flexible display 20 is fully extended. When first determining module 2 determines that the flexible display 20 is fully extended, the eliminating module 5 eliminates the first early-warning information from the flexible display 20, such that the user no longer extends the flexible display 20 to avoid damage to the flexible display 20.

Further, the early warning apparatus 10 further includes a message indicating module 6.

Further, the early warning control apparatus 10 further includes a message indicating module 6.

The message indicating module 6 is configured to send a message for indicating end of extension.

In detail, after the first early-warning information is eliminated from the flexible display 20, the message indicating module 6 may display the message for indicating the end of extension in the flexible display 20, such that the user may intuitively know that the flexible display 20 is fully extended, thus preventing from damaging the flexible display 20.

Further, the first determining module 2 is further configured to, when current extended length is the first preset length threshold, determines whether the flexible display 20 receives a trigger signal.

The generating module 4 is further configured to, when the detecting module 2 detects that the flexible display 20 receives the trigger signal, generate second early-warning information on the flexible display 20.

In detail, when the flexible display 20 is fully extended, the first determining module 2 further determines whether the flexible display 20 is extruded by an external force, i.e., whether the flexible display 20 receives the trigger signal, if yes, the generating module 4 generates the second early-warning information on the flexible display 20 to prompt the user that the flexible display 20 begins to curl up.

The early warning apparatus 10 and the flexible display apparatus 100 according to the present disclosure generate the first early-warning information on the flexible display 20 when the flexible display 20 satisfies the extension early-warning condition, such that the user can intuitively acquire a current extension state of the flexible display 20 from the first early-warning information in the flexible display 20 when the flexible display 20 is almost fully extended, and the early warning apparatus 10 and the flexible display apparatus 100 further eliminate the first early-warning information from the flexible display 20 when the current extended length of the flexible display 20 satisfies the first preset length threshold, such that the user may no longer extend the flexible display 20 to avoid damage to the flexible display 20. The early warning method may serve as a warning to the user.

The forgoing description is only directed to preferred embodiments of the present disclosure, but not used to limit the present disclosure. All modifications, equivalents, variants and improvements made within the spirit and principle of the present disclosure shall fall within the protection scope of the present disclosure.

What is claimed is:

1. An early warning method, comprising:
   generating first early-warning information on a flexible display when the flexible display stored in a flexible display apparatus satisfies an extension early-warning condition;
   obtaining a first extended length of the flexible display;
   determining whether the first extended length reaches a first preset length threshold; and
   eliminating the first early-warning information from the flexible display to prompt a user not to further extend the flexible display to avoid damage to the flexible display when the first extended length reaches the first preset length threshold;
   wherein the method further comprises:
   detecting whether the flexible display is extruded by an external force when the first extended length is the first preset length threshold, if yes, a trigger signal is received, wherein the trigger signal is configured to cause a second early-warning information being displayed on the flexible display to prompt the user that the flexible display begins to curl up in response to the external force; and
   displaying the second early-warning information on the flexible display when the flexible display receives the trigger signal.

2. The method of claim 1, wherein the flexible display stored in the flexible display apparatus satisfying the extension early-warning condition is determined by acts of:
   obtaining a second extended length of the flexible display when the flexible display stored in the flexible display apparatus begins to extend;
   determining whether the second extended length reaches a second preset length threshold; and
   determining that the flexible display satisfies the extension early-warning condition when the second extended length reaches the second preset length threshold.

3. The method of claim 1, wherein generating the first early-warning information on the flexible display comprises:

activating a circuit signal in the flexible display;
controlling the flexible display according to the circuit signal to generate the first early-warning information; and
displaying the first early-warning information.

4. The method of claim 1, further comprising:
sending a message for indicating end of extension when the first extended length reaches the first preset length threshold.

5. The method of claim 1, wherein the first preset length threshold is a length of the flexible display when the flexible display is fully extended.

6. The method of claim 2, wherein the second preset length threshold is 90% of a length of the flexible display when the flexible display is fully extended.

7. The method of claim 1, wherein the first early-warning information is selected from a group including graphic information, and information composed of graphic and text.

8. An early warning apparatus, comprising: a non-transitory computer-readable medium comprising computer-executable instructions stored thereon, and an instruction execution system configured by the instructions to implement at least one of:
a generating module, configured to generate first early-warning information on a flexible display when the flexible display stored in a flexible display apparatus satisfies an extension early-warning condition;
an obtaining module, configured to obtain a first extended length of the flexible display;
a first determining module, configured to determine whether the first extended length reaches a first preset length threshold; and
an eliminating module, configured to eliminate the first early-warning information from the flexible display to prompt a user not to further extend the flexible display to avoid damage to the flexible display when the first determining module determines that the first extended length reaches the first preset length threshold;
wherein the first determining module is further configured to detect whether the flexible display is extruded by an external force when the first extended length is the first preset length threshold, if yes, a trigger signal is received, wherein the trigger signal is configured to cause a second early-warning information being displayed on the flexible display to prompt the user that the flexible display begins to curl up in response to the external force; and
wherein the generating module is further configured to display the second early-warning information on the flexible display when the flexible display receives the trigger signal.

9. The apparatus of claim 8, wherein the instruction execution system is further configured to implement a second determining module, wherein,
the obtaining module is further configured to obtain a second extended length of the flexible display when the flexible display stored in the flexible display apparatus begins to extend;
the first determining module is further configured to determine whether the second extended length reaches a second preset length threshold; and
the second determining module is configured to determine that the flexible display satisfies the extension early-warning condition when the first determining module determines that the second extended length reaches the second preset length threshold.

10. The apparatus of claim 8, wherein the generating module comprises:
an activating unit, configured to activate a circuit signal in the flexible display;
a generating unit, configured to control the flexible display according to the circuit signal to generate the first early-warning information; and
an image displaying unit, configured to display the first early-warning information.

11. The apparatus of claim 8, wherein the instruction execution system is further configured to implement:
a message indicating module, configured to send a message for indicating end of extension, when the first extended length reaches the first preset length threshold.

12. The apparatus of claim 8, wherein the first preset length threshold is a length of the flexible display when the flexible display is fully extended.

13. The apparatus of claim 9, wherein the second preset length threshold is 90% of a length of the flexible display when the flexible display is fully extended.

14. A flexible display apparatus, comprising a flexible display, a sensor, and a controller; wherein:
the sensor is configured to sense a first extended length of the flexible display; and
the controller is configured to send an electronic signal according to the first extended length, the electronic signal being configured to indicate the flexible display to generate first early-warning information and to indicate the flexible display to eliminate the first early-warning information to prompt a user not to further extend the flexible display to avoid damage to the flexible display;
wherein the controller is further configured to detect whether the flexible display is extruded by an external force when the first extended length is the first preset length threshold, if yes, a trigger signal is received, wherein the trigger signal is configured to cause a second early-warning information being displayed on the flexible display to prompt the user that the flexible display begins to curl up in response to the external force; and to display the second early-warning information on the flexible display when the flexible display receives the trigger signal.

15. The flexible display apparatus of claim 14, wherein the controller is configured to:
send a first electronic signal when the first extended length reaches a first preset length threshold, wherein the first electronic signal indicates the flexible display to eliminate the first early-warning information; and
send a second electronic signal when the first extended length reaches a second preset length threshold, wherein the first preset length threshold is greater than the second preset length threshold and the second electronic signal indicates the flexible display to generate the first early-warning information.

16. The flexible display apparatus of claim 15, wherein the first preset length threshold is a length of the flexible display when the flexible display is fully extended.

17. The flexible display apparatus of claim 15, wherein the second preset length threshold is 90% of a length of the flexible display when the flexible display is fully extended.

18. The flexible display apparatus of claim 14, wherein the controller is further configured to control the flexible display to display a message for indicating end of extension when the first extended length reaches a first preset length threshold.

* * * * *